United States Patent [19]
Neumeier

[11] 4,182,938
[45] Jan. 8, 1980

[54] TELEPHONE SUPPORTING SET
[76] Inventor: Robert G. Neumeier, Häus Nymphenburg, Am Strandbad 8, 8182
[21] Appl. No.: 912,341
[22] Filed: Jun. 5, 1978
[30] Foreign Application Priority Data
Jun. 3, 1977 [DE] Fed. Rep. of Germany ... 7717566[U]
Apr. 22, 1978 [DE] Fed. Rep. of Germany ... 7812289[U]
[51] Int. Cl.² .............................................. H04M 1/21
[52] U.S. Cl. ................................. 179/147; 179/179X
[58] Field of Search ......................................... 179/147
[56] References Cited
U.S. PATENT DOCUMENTS
2,522,361  9/1950  Hill ............................... 179/147 UX
FOREIGN PATENT DOCUMENTS
998475  9/1951  France ....................................... 179/147
208093  3/1940  Switzerland .............................. 179/147

Primary Examiner—William C. Cooper
Attorney, Agent, or Firm—Brady, O'Boyle & Gates

[57] ABSTRACT

A lower base support has a relatively flat portion for supporting a telephone and a raised portion with a downwardly and forwardly sloping face, shallow spring biased drawers, respectively beneath the flat portion and raised portion containing a phone number index and interchangeable note pad beneath a hinged cover on the drawer. Release keys are provided for unlatching the drawers and moving them by biasing springs to the open positions, and a central recess in the sloping face of the raised portion has a sloping support face for a calculation or tape recorder unit, with a horizontal surface portion at the top of the sloping support face to assist in pivoting the units out of the recess when inward pressure is applied to the tops thereof, similar recesses for a writing implement or a cooperating microphone, and through slots across the top of the raised portion for sound emission from an amplifier connected therebeneath in the raised portion.

10 Claims, 5 Drawing Figures

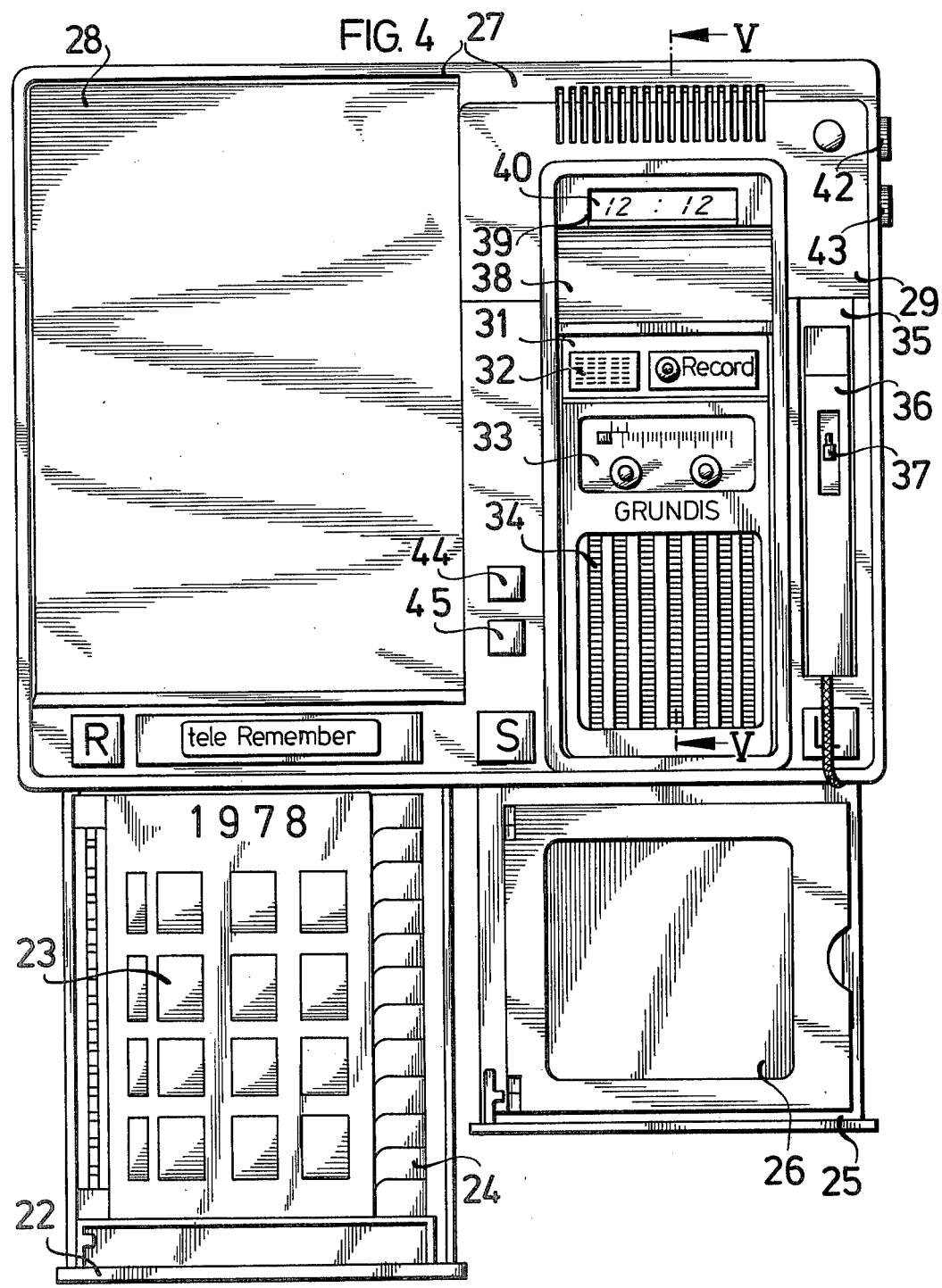

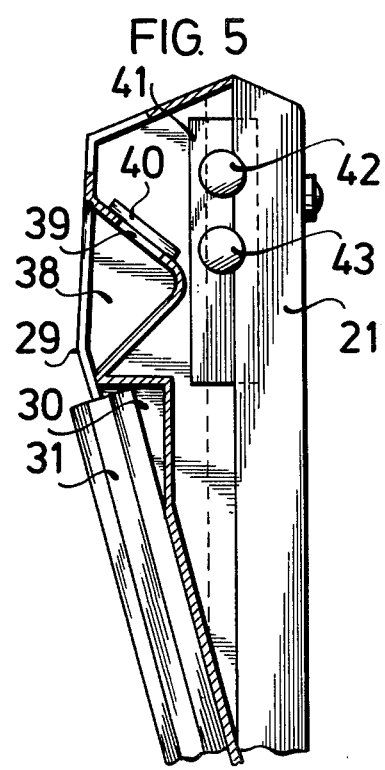

4,182,938

TELEPHONE SUPPORTING SET

BACKGROUND OF THE INVENTION

Field of the Invention

The present invention relates to a telephone supporting set which is designed to contain all the items which should be within easy reach in order to efficiently carry on a telephone conversation.

These items include the means for determining the exact time of a call, the possibility of permanently or temporarily jotting down on a removable piece of paper the salient points of the other person's conversation for lengthier perusal, the possibility of rapidly providing the telephone number of a third party and the opportunity to make brief calculations such as reliably calculating the price of a specific number of items with or without extras or deductions and of providing an immediate quote.

SUMMARY OF THE INVENTION

The present invention relates to all these items which are supplied by a supporting set comprising partially removable drawers which are each moved forwards slightly by a spring, a locking pawl which keeps the drawers in the closed position, a desk-type raised part over the right portion of the support comprising recessed and rearwardly inclined supporting surfaces in the front portion designed to hold a pocket computer with or without solar cells, a dictating machine, possibly with its own microphone, a recess in the highest part of the desk-type raised part designed to hold a clock or an adjustable date indicator and a sufficiently large space with a row of longitudinal slits for holding a telephone amplifier.

The drawing shows an embodiment of a telephone supporting set according to the invention.

BRIEF DESCRIPTION OF THE DRAWING

FIG. 4 is a top plan view of a slightly modified form of the supporting set with the two drawers released to the open positions by the application of pressure on the keys; and FIG. 5 is a partial cross-sectional view taken substantially along the line V—V of FIG. 4.

DESCRIPTION OF THE PREFERRED EMBODIMENT

Figure 1:
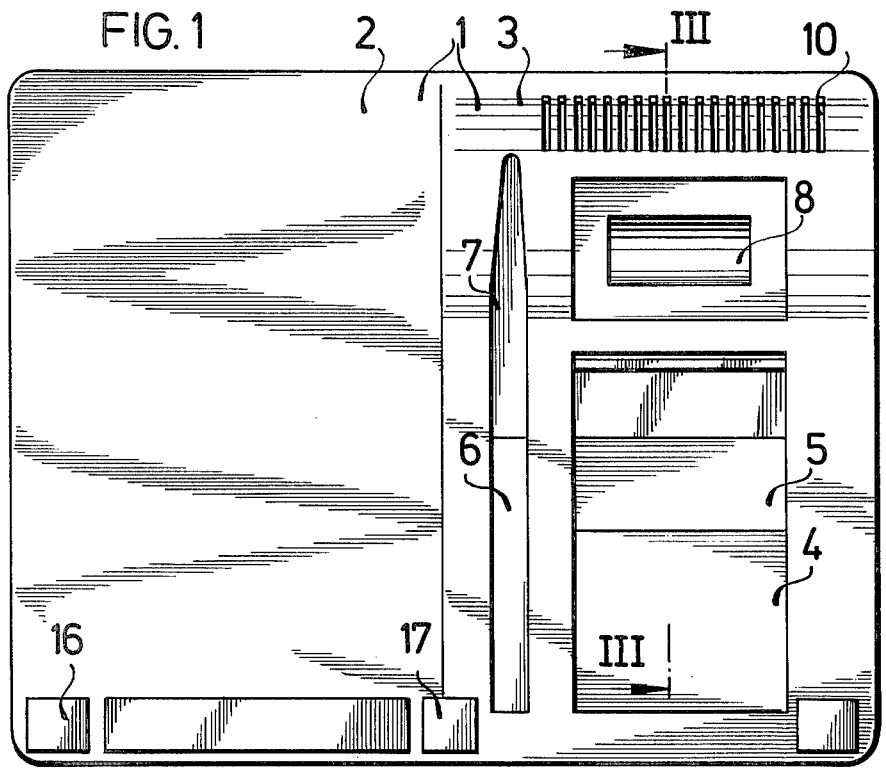
FIG 1 is a top view of the telephone supporting set according to the invention.

The telephone supporting set according to the invention consists of an upper part 1, the left part 2 of which forms a flat support surface for holding any type of conventional telephone, and the right part 3 of which is raised in the manner of a desk. In the sloping top surface of raised part 3, a recessed surface 4 is formed which is obliquely inclined toward the rear, and becomes a surface in the horizontal plane at the upper rear end 5 so as to enable a pocket computer placed on the sloping face 4 to be tilted by the application of pressure onto its upper end into the horizontal position and easily removed from the recess. The same applies to the recessed narrow upwardly and rearwardly sloping face 6 designed to hold a writing implement. The writing implement can also be easily titled away from the recessed face 6 by the application of pressure on the upper part of the implement, pivoting it down onto the upper horizontal portion 7 and away from the top surface 6 for easy removal from the recess.

On the highest point of the desk-type raised portion is a trough mounting 8 designed to hold a manually adjustable date indicator or a clock or both. The rear end of the raised right part of the supporting set is provided with a row of sound of sound emitting slits 10 therethrough, and is designed to hold a telephone amplifier in the base beneath the slits, as will become apparent further in this disclosure.

The open lower side of the upper part 1 of the telephone supporting set according to the invention is closed by a flat lower panel 11 on which drawers 12,13 are slidably connected. The drawers are each pushed forwards to the open position by a leaf spring 14,15 connected in a spring loaded state at the base panel 11, and the drawers are held in their initial closed position by locking pawls beneath the drawer released push buttons 16,17 and are selectively released by the application of pressure on one of the push buttons 16 or 17. The drawer 12 is intended, for example, for a telephone member recorder index. In the embodiment shown the drawer 13 is equipped with a cushioned hinged cover 18, which retains an interchangeable note pad or individual notelets. The opening 19 is used to insert the telephone amplifier from beneath the lower panel 11.

A modified form of the phone support stand is shown in FIGS. 4 and 5. The telephone supporting set according to FIGS. 4 and 5 consists of a lower part or base shell 21 of uniform height designed to hold the drawer 22 containing the calendar 23 and telephone number recorder index 24, and the drawer 22 is released from its closed locked position by applying pressure on the release key R. In like manner, the drawer 25 is assembled in the base part 21 and released from its closed locked position by applying pressure on the second release key S. Drawer 25 contains the exchangeable writting surface 26. By actuating the release keys R and/or S the locking pawls are disengaged from the drawers allowing the springs 14 and 15 to urge the drawers forwardly or outwardly to the open positions shown in FIG. 4.

Figure 3:
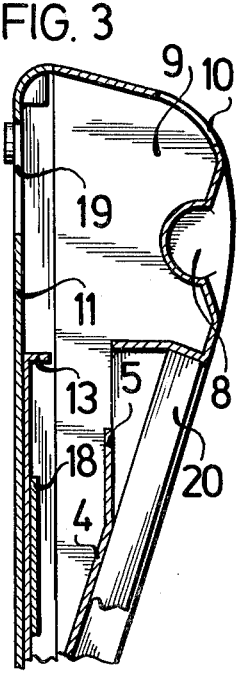
FIG. 3 is a partial cross-sectional view taken substantially along the line III—III of FIG. 1.
Figure 2:
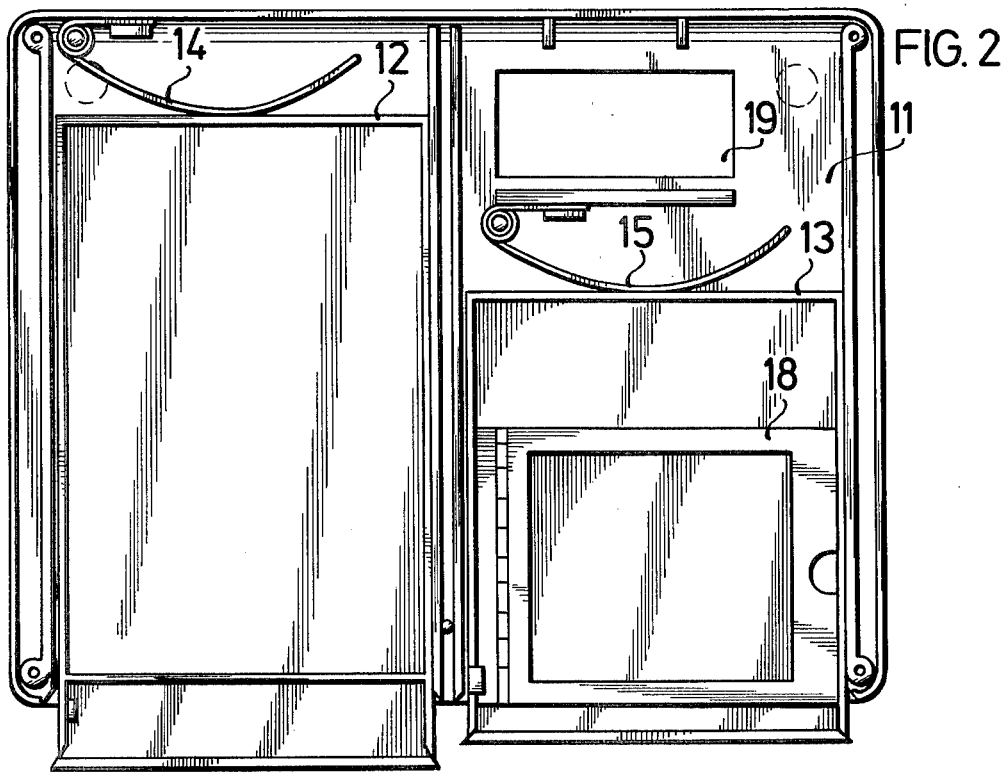
FIG. 2 is a top plan view of the base of the supporting set.

An upper part 27 fits on the lower part 21. On the left side 28 this upper part 27 is low and is designed to form a stand for holding a telephone. On the right side it comprises a desk-type raised part 29, similar to part 3 in the form shown in FIGS. 1-3, the central recess 30 of which is designed to hold a compact dictating machine 31, with built-in microphone 32, a tape cassette 33 and a loudspeaker 34. Adjacent to the compact dictating machine 31 is a long groove 35 in the upper part 27 adapted to hold an additional microphone 36 connected to the dictating machine and including an energizing and de-energizing switch 37. Behind the compact dictating machine is a transverse recess 38 having a forward facing sloped wall with an opening 39 therein for a clock 40, such as a digital display clock.

The space beneath the quartz digital clock 40 is designed to hold a telephone amplifier 41, accessible through the bottom opening 19, and having adjustment knobs 42,43. The amplifier is connected to be switched on and off by switch keys 44,45 on the upper surface of upper part 27. It can also be replaced by a radio if desired, with the adjustment knobs 42,43 these representing station selection and volume control adjustments.

The amplifier 41 is provided with plug-in connections, not shown, for connection to the phone or other selected device.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

What is claimed is:

1. A telephone supporting set comprising a base support having a low flat portion supporting a telephone thereon, a raised portion on said base support adjacent to said flat portion, said raised portion having a downwardly and forwardly sloping surface, a recess provided in said sloping surface, said recess having a downwardly and forwardly sloping bottom wall, the top of the sloping bottom wall of said recess having a portion offset from the plane of the sloping bottom wall, a removable component providing a telephone conversational aid supported in said recess, the top portion of said component at the top of the sloping recess extending over and being spaced from said offset portion, whereby the component may be removed from the recess by pressing downwardly on the top edge portion of said component causing the component to pivot about the junction between the sloping bottom wall of the recess and the offset portion, thereby pivoting the bottom portion of the component upwardly away from the recess in the sloping surface.

2. A telephone supporting set according to claim 1, wherein the offset portion is disposed in a substantially horizontal plane.

3. A telephone supporting set according to claim 1, wherein a plurality of said recesses are provided in said sloping surface, each recess adapted to support a respective component.

4. A telephone supporting set according to claim 1, wherein drawer means are provided in the base support.

5. A telephone supporting set according to claim 4, wherein said drawer means comprises a drawer slidably mounted in the base support beneath the flat portion, and another drawer slidably mounted in the base support beneath said raised portion.

6. A telephone supporting set according to claim 5, wherein spring means are mounted in said base support for biasing said drawers to the open position, and latch means mounted in said base support and operatively connected to said drawers for releasably holding said drawers in the closed position.

7. A telephone supporting set according to claim 6, wherein a telephone recorder is mounted within one drawer and a hinged interchangeable note pad is mounted in the other drawer.

8. A telephone supporting set according to claim 3, wherein a pocket computer is removably mounted in one recess and a writing implement is removably mounted in another recess.

9. A telephone supporting set according to claim 3, wherein a compact dictating machine is removably mounted in one recess and a hand-held microphone is removably mounted in another recess.

10. A telephone supporting set according to claim 1, wherein an opening is provided in the base support beneath the raised portion, a telephone amplifier inserted through said opening and positioned beneath said raised portion.

* * * * *